(12) United States Patent
Killadi et al.

(10) Patent No.: US 10,693,723 B2
(45) Date of Patent: Jun. 23, 2020

(54) NETWORK UPGRADES

(71) Applicant: Hewlett Packard Enterprise Development LP, Houston, TX (US)

(72) Inventors: Srinivas Rao Killadi, Bangalore (IN); Sree Vasthav Shatdarshanam Venkata, Bangalore (IN); Indu Shree Akasapu, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 94 days.

(21) Appl. No.: 16/042,047

(22) Filed: Jul. 23, 2018

(65) Prior Publication Data

US 2020/0028738 A1    Jan. 23, 2020

(51) Int. Cl.
*H04L 12/24*  (2006.01)
*H04L 12/26*  (2006.01)

(52) U.S. Cl.
CPC .......... *H04L 41/082* (2013.01); *H04L 43/067* (2013.01)

(58) Field of Classification Search
CPC ........................... H04L 41/082; H04L 43/067
See application file for complete search history.

(56) References Cited

U.S. PATENT DOCUMENTS

| 7,957,330 | B1* | 6/2011 | Bahadur | H04L 41/082 |
| | | | | 370/216 |
| 8,417,991 | B2 | 4/2013 | Venkataraja et al. | |
| 8,438,253 | B2 | 5/2013 | Szabo et al. | |
| 9,032,053 | B2 | 5/2015 | Kosuru et al. | |
| 9,792,110 | B2 | 10/2017 | Baset et al. | |
| 2007/0006207 | A1* | 1/2007 | Appaji | G06F 8/65 |
| | | | | 717/168 |
| 2011/0161949 | A1 | 6/2011 | Kodaka | |
| 2016/0359872 | A1* | 12/2016 | Yadav | H04L 43/04 |
| 2017/0277533 | A1* | 9/2017 | Tian | G06F 8/654 |

OTHER PUBLICATIONS

Applying a Manual One-time Update to the Cluster, (Web Page), Retrieved Feb. 26, 2018, 1 Pg.

* cited by examiner

*Primary Examiner* — Arvin Eskandarnia
(74) *Attorney, Agent, or Firm* — Brooks, Cameron & Huebsch, PLLC

(57) ABSTRACT

An example of a system may include a processing resource and a computing device comprising instructions executable by the processing resource to determine an interval based on an amount of time to upgrade a network; determine a series of time windows based on the interval; analyze data traffic in the network over the series of time windows; identify a subset of the series of time windows that are sequential and non-overlapping; and select a particular time window from the subset of the series of time windows to perform an upgrade of the network based on the analyzed data traffic.

15 Claims, 5 Drawing Sheets

NETWORK UPGRADES

BACKGROUND

Networking devices may send and/or receive data within a computing network. Upgrades to the network may be applied to the network in order to upgrade the performance, reliability, and/or security of the network. Applying the upgrades to the network may interrupt network performance.

DETAILED DESCRIPTION

Figure 1:
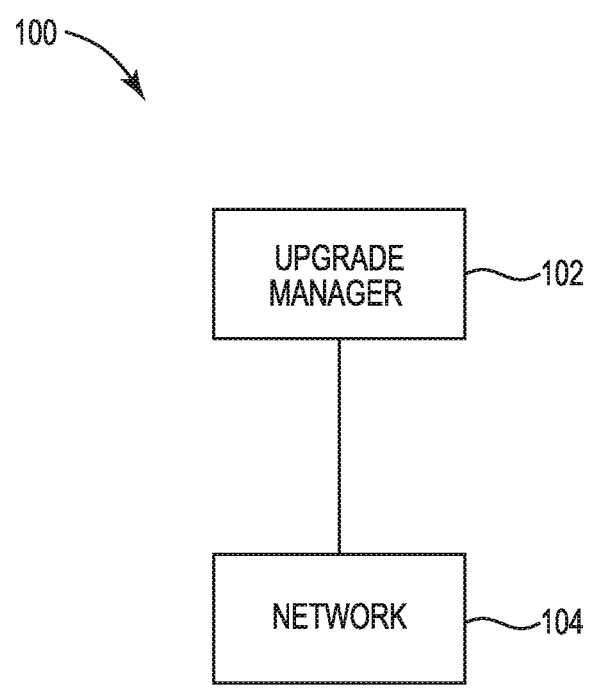
FIG. 1 illustrates an example of a system for network upgrades consistent with the disclosure.

As used herein, a network device may include a computing device that is adapted to transmit and/or receive signaling and to process information within such signaling across a network. For example, a network device may include a client device, an access point, and/or a data transfer device.

As used herein, a client device may include a computing device including hardware and/or a combination of hardware and instructions executable by the hardware to access and/or communicate with the network and/or other network devices on the network. For example, a client device may include any data processing equipment such as a computer, cellular phone, personal digital assistant, tablet devices, etc.

As used herein, an Access Point (AP) may include a computing device including hardware and/or a combination of hardware and instructions executable by the hardware to operate as a transmitter and/or a receiver of signals between a client device, other access points, a controller, and/or other network devices on the network. In some examples, an AP may act as a transmitter and/or receiver of wireless radio signals for any known or convenient wireless access technology which may later become known. While the term AP may include network devices that transmit and/or receive IEEE 802.11-based Wi-Fi signals, AP is not intended to be limited to IEEE 802.11-based APs. APs may generally function as an electronic device that is adapted to allow wireless computing devices, such as client devices, to connect to a wired network via various communications standards. An AP can include a processing resource, memory, and/or input/output interfaces, including wired network interfaces such as IEEE 802.3 Ethernet interfaces, as well as wireless network interfaces such as IEEE 802.11 Wi-Fi interfaces and/or 802.15 interfaces, although examples of the disclosure are not limited to such interfaces. An AP can include a memory resource, including read-write memory, and a hierarchy of persistent memory such as ROM, EPROM, and Flash memory.

As used herein, a data transfer device may include a computing device including hardware and/or a combination of hardware and instructions executable by the hardware to operate as an intermediary device for coordinating the transfer of data between network device across a network and/or to other networks. For example, a data transfer device may include network switches, routers, controllers, etc.

As used herein, a network controller may include a computing device including hardware and/or a combination of hardware and instructions executable by the hardware to manage APs and data transfer among the APs in the network. A controller may include a wireless local area network (WLAN) controller. The WLAN controller may coordinate the operation of and/or communication between APs in the network to mitigate interference between wireless APs, to perform load balancing, to provide fail over redundancy, to retrieve upgrades, and/or to send updates to the APs, etc. In some examples, the APs may connect, via a wired connection and/or wirelessly, to a controller and the controller may connect to a wireless network. In some examples, the controller may be AP-based controllers that are integrated with the AP.

In some examples, multiple wired access points may be grouped together in a same network. As such, the APs may work together to provide network coverage and/or data communication across the network. The multiple APs may be controlled by a cluster controller and/or a plurality of cluster controllers. For example, an interconnected collection of a plurality of controllers in an active mode may be utilized to control and move clients among APs in the cluster and/or APs between controllers of the plurality of controllers. For example, a clustered network may include a plurality of nodes that may be able to redundantly perform a same task. Each node may include a controller and a set of APs. Each node may be running its own instance of executable instructions and each node may utilize similar or identical hardware. The controller and/or controllers of the clustered network may operate to distribute and/or coordinate data traffic, APs, data load, and/or clients across the various nodes. In some examples, a master controller may coordinate the activities of the plurality of controllers.

Upgrades may be occasionally applied to the network. As used herein, an upgrade may include a modification to the hardware, the executable instructions, and/or a combination of the hardware and the executable instructions of the network devices. The modification may include changes to the network devices to upgrade the performance, reliability, and/or security of the network. In some examples, upgrading a network may include retrieving, communicating, installing, and/or applying a new version or image of software, firmware, operating system, network settings, etc. for a portion of the network devices.

Upgrading the network may utilize computing resources of the network device and/or interrupt the function of the network devices during the upgrade. For example, during a network upgrade a network device may not provide connectivity to the network and/or data communication across the network. As such, connectivity and/or data communication across the network may be interrupted, degraded, slowed, and/or discontinued during the upgrade. For example, a client device may lose its connection to the network, may experience dropped packets, may experience slowing of data transmission, and/or may experience an interrupted or dropped session. Such interruptions may disrupt client sessions, aggravate clients, and/or damage a reputation of an enterprise and/or institution providing data service with the network.

In some examples, network administrators may send a message to clients warning of potential network outages, interruptions, and/or slowdowns during a time period when an upgrade to the network will be applied. While providing such messages may provide clients an opportunity to schedule their session accordingly, the interruption may still be an undesirable happening to the clients. Further, in some examples, an upgrade to a network may interrupt the activity of network devices for a period of time, such as an hour, which may pose an unacceptable loss of productivity to the clients and/or to an enterprise and/or institution providing data service with the network. Furthermore, interrupting the activity of the network devices during particular time windows of the day may be more impactful than others. For example, a network upgrade that interrupts the activity of the network devices for one hour may be far more harmful in the middle of the work day verses in the middle of the night. As such, network administrators may make assumptions about when is the best time window to apply an upgrade and/or interrupt the activity of network devices and the service provided by the network. Such assumptions may not accurately account for the actual network conditions during that time window but may instead reflect a bias of the network administrator.

In contrast, examples of the present disclosure may determine an interval based on an amount of time to upgrade the network, determine a series of time windows based on the interval, analyze data traffic in the network over the series of time windows, identify a subset of the series of time windows that are sequential and non-overlapping, and select a particular time window from the subset of the series of time windows to perform and upgrade of the network based on the analyzed data traffic. Therefore, instead of relying on the assumption of a network administrator, examples may utilize a data-driven approach to observing network conditions and identifying a time to perform an upgrade at a time where an amount and/or type of data traffic in the network will be at a relative minimum.

FIG. 1 illustrates a system 100 for network upgrades consistent with the disclosure. The system 100 may include a network 104. The network 104 may include a computing network. The network 104 may include a computing network for data communication. In some examples, the system 100 may include a wireless computing network for wirelessly data communication. In some examples, the system 100 may include a wireless local area network (WLAN) for data communication.

The network 104 may include interconnected network devices that operate to communicate and/or manage the communication of data traffic on the network 104. The network 104 may include a clustered computing network. For example, the network 104 may include one or more APs and one or more controllers. For example, a plurality of controllers may be utilized to manage the data communication from and to a plurality of APs. In some examples, a master controller may be utilized to manage the activities of other controllers of the plurality of controllers in the network.

Client devices may access the network 104 by associating with an AP. The controllers may manage the association of the client devices to the AP. In some examples, the controllers may manage which AP of a plurality of APs in the network that a particular client device may associate with.

The client devices may engage in a session on the network 104. For example, the client devices engage in a session including the interchange of data with other computing devices (e.g., network devices on the same network, network devices on another network connected to the network, a server on the network, a server on another network connected to the network, another client device on the same network, another client device on another network connected to the network, etc.). The session may include an interactive exchange of data packets between the client device, the APs, a controller, and/or other network devices.

Client devices may engage in different types of sessions on the network. For example, a client device may engage in an exchange of a particular type of data packets and/or engage in the exchange with a particular type of application. In an example, a session may include a session for exchange of video data over the network. For example, the session may include a video streaming session with a video streaming application or service, transmitting video data across the network 104. In another example, a session may include a session for exchange of voice data over the network. For example, the session may include a voice streaming session with a voice over IP (VOIP) streaming application or service, transmitting voice data across the network 104. For example, a session may include a VOIP call from and/or to the client device over the network 104.

The system 100 may include an upgrade manager 102. The upgrade manager 102 may include instructions executable by a processing resource to perform various functions associated with network upgrades. The upgrade manager 102 may be located on a network device and/or distributed among network devices on the network 104. For example, the upgrade manager 102 may be executed by a processing resource of a network device and/or executed by the processing resources of a plurality of network devices. In an example, the upgrade manager 102 may include a computing device such as a network controller comprising instructions executable by the processing resource of the network controller to perform various functions associated with network upgrades.

As described above, the network 104 may be upgraded. Specifically, the network devices on the network 104 may be updated. For example, a new firmware image, operating system image, security update, configuration settings may be applied to network devices and/or client devices through network devices with an upgrade. As also described above, the upgrade may take an amount of time to perform. The amount of time that the upgrade takes to perform may be quantified by the amount of time that it takes to retrieve the new image, communicate the new image to the target network device, apply the new image to the target network device, and/or restart or bring the target network device back to an operational state after applying the new image. In some examples, the amount of time that the upgrade takes may be quantified by the amount of time that the network 104 and/or the constituent network devices of the network 104 will have their network functionality discontinued and/or retarded while the upgrade is being retrieved and/or applied in the network 104.

The upgrade manager 102 may operate to manage the retrieval, communication, and application of an upgrade to the network 104. The upgrade manager 102 may operate utilizing a data-driven approach to scheduling the network upgrades in a manner that will reduced the impact to client devices and/or client device sessions on the network 102. Further, the upgrade manager 102 may identify time windows for performing an upgrade that are tailored and/or specific to a variety of data traffic conditions in the network 104.

The upgrade manager 102 may determine an upgrade interval of time. The upgrade interval of time may be a length of time that an upgrade to the network 104 will take. That is, the upgrade interval of time may be based on the amount of time that the upgrade will take.

In some examples, the upgrade manager 102 may determine characteristics of the upgrade in order to inform the upgrade interval of time. For example, the upgrade manager 102 may receive a notification that a network upgrade is available for the network 104 and the notification may include characteristics of the upgrade. In some examples, the upgrade manager 104 may retrieve the upgrade file and perform an analysis of the upgrade and/or associated metadata in order to determine characteristics of the upgrade.

The upgrade manager 102 may utilize the characteristics of the upgrade to identify the upgrade time interval. For example, the upgrade interval of time may be a generic interval associated with a characteristic of the upgrade such as a type of the upgrade. For example, the upgrade interval may be a one-hour upgrade interval for an access point operating system update. In another example, the upgrade interval may be a specific interval associated with a characteristic of the upgrade such as an estimated amount of time to apply the upgrade determined by the upgrade manager 102 from its analysis of the new image and/or its metadata. For example, the upgrade interval may be a fifty-seven-minute upgrade interval based on an analysis of the new image yielding a determination that the upgrade to the network will take fifty-seven minutes before full functionality and/or network performance is restored to the network after initiating the upgrade.

As such, the upgrade interval may be a window of time within which the network upgrade may be completed. That is, the upgrade interval may include a window of time within which network services and/or functionality may be interrupted, retarded, and/or unavailable during the retrieval, communication, application, and/or reestablishment of the network devices on the network 104.

The upgrade manager 102 may determine a series of time windows based on the interval. The series of time windows may be a series of time windows of a same duration of time as the upgrade time interval. For example, an amount of time to perform an upgrade may be determined by the upgrade manager 102 to be one hour in duration. As such, the upgrade manager 102 may determine a series of time windows where each of the series of time windows has a duration of one hour. For example, the series of time windows may include a subset of the series such as 7:00 AM-8:00 AM, 8:00 AM-9:00 AM, 9:00 AM-10:00 AM, etc. Again, while each time window in each series of time windows in the above example is one hour, the duration of each time window may be any duration that corresponds to the amount of time to perform an upgrade. The series of time windows may be overlapping and non-identical time windows. For example, the series of time windows may also include subsets such as 7:01 AM-8:01 AM, 8:01 AM-9:01 AM, 9:01 AM-10:01 AM, etc.; 7:02 AM-8:02 AM, 8:02 AM-9:02 AM, 9:02 AM-10:02 AM, etc.; 7:03 AM-8:03 AM, 8:03 AM-9:03 AM, 9:03 AM-10:03 AM, etc.; etc. In this manner, an upgrade manager 102 may iterate through determining each time window with an interval matching the upgrade interval that exists within a period of time such as a twenty-four-hour period of time. While each of the series of time windows in the above example differ by one-minute offsets, the examples contemplated herein are not so limited and the offsets may be any amount of time (any amount of fractions of a second, any amount of seconds, any amount of minutes, any amount of hours, any amount of days, any amount of weeks, any amount of months, any amount of years, any amount of a combination thereof, etc.)

The upgrade manager 102 may analyze data traffic in the network over the series of time windows. In an example, the analyzed data traffic may include historical data traffic. For example, data traffic in the network 104 may be detected, determined, collected and/or recorded. For example, network devices in the network 104 may detect, determine, collect, and/or record data traffic. In some examples, a network device such as a controller or an AP may detect, determine, collect, and/or record an amount of data traffic. An amount of data traffic may include a quantity of data traversing the network 104, a quantity of packets traversing the network 104, a quantity of client devices, a quantity of client device sessions, a quantity of requests, a proportion of a capacity of a network 104 being utilized for data transmission, etc. The network devices may record an amount of data traffic at or through each individual network device or node of the network 104.

In some examples, deep packet inspection (DPI) data processing may be utilized to process data traffic in the network by inspecting the details or metadata of the data traffic being sent in the network 104. DPI may be utilized at, for example, controllers in the network 104 to identify a type of the data traffic in the network 104. For example, DPI may be utilized to detect, determine, and/or record the character of data packets in the network 104 and/or the character of the corresponding client sessions. For example, DPI may be utilized to detect, determine, collect, and/or record whether data traffic and/or the corresponding client sessions are VOIP packets/sessions and/or video streaming packets/sessions. In some examples, the amount of each type of data traffic and/or type of client session may be detected, determined, collected, and/or recorded.

The data traffic may be detected, determined, collected, and/or recorded to be stored over and/or up to a predetermined monitoring period of time. For example, the data traffic may be detected, determined, collected, and/or recorded for a monitoring period of time such as thirty days. That is, the data traffic occurring over the prior thirty days may be detected, determined, collected, and/or recorded. In some examples, the data traffic detected, determined, collected, and/or recorded at the beginning of the monitoring period may be sequentially erased and/or overwritten by a most recent amount of data traffic detected, determined, collected, and/or recorded after the expiry of the monitoring period, such that the data traffic detected, determined, collected, and/or recorded over the most recent period of time equal to the monitoring period will be the data traffic that remains stored. For example, if the monitoring period is thirty days, then the data traffic detected, determined, collected, and/or recorded of the thirty-first day may overwrite the data traffic detected, determined, collected, and/or recorded on the first day, so as to retain the most recent thirty days of data traffic data in storage.

As such, historical data about the data traffic in the network 104 over a monitoring period may be stored by and/or accessible to the upgrade manager 102. The upgrade manager 102 may analyze the data traffic in the network 104. That is, the upgrade manager 102 may analyze the stored historical data traffic from the monitoring period.

The upgrade manager 102 may analyze the data traffic in the network 104 over the above-described determined series of time windows. For example, the upgrade manager 102 may segment the monitoring period into the series of time windows and analyze the data traffic within each of the time windows. In an example, the upgrade manager 102 may determine the series of time windows including 7:00 AM-8:00 AM, 8:00 AM-9:00 AM, 9:00 AM-10:00 AM, etc.; 7:01 AM-8:01 AM, 8:01 AM-9:01 AM, 9:01 AM-10:01 AM, etc.; 7:02 AM-8:02 AM, 8:02 AM-9:02 AM, 9:02 AM-10:02 AM, etc.; 7:03 AM-8:03 AM, 8:03 AM-9:03 AM, 9:03 AM-10:03 AM, etc.; etc. Continuing the example, the upgrade manager 102 may, for the purposes of analysis, segment the data traffic detected, determined, collected, and/or recorded over the monitoring period into the series of time windows. For example, the upgrade manager 102 may analyze the data traffic stored over the monitoring period that was collected within each of the series of time windows including 7:00 AM-8:00 AM, 8:00 AM-9:00 AM, 9:00 AM-10:00 AM, etc.; 7:01 AM-8:01 AM, 8:01 AM-9:01 AM, 9:01 AM-10:01 AM, etc.; 7:02 AM-8:02 AM, 8:02 AM-9:02 AM, 9:02 AM-10:02 AM, etc.; 7:03 AM-8:03 AM, 8:03 AM-9:03 AM, 9:03 AM-10:03 AM, etc.; etc. of the monitoring period.

The upgrade manager 102 may analyze the data traffic and determine an amount of clients utilizing the network during each of the series of time windows and/or a type of client session or number of a type of client session utilizing the network 104 during each of the series of time windows. For example, the upgrade manager may determine an amount of clients utilizing the network during each of the series of time windows and/or a type of client session or number of a type of client session utilizing the network 104 during each instance of 7:00 AM-8:00 AM, 8:00 AM-9:00 AM, 9:00 AM-10:00 AM, etc.; 7:01 AM-8:01 AM, 8:01 AM-9:01 AM, 9:01 AM-10:01 AM, etc.; 7:02 AM-8:02 AM, 8:02 AM-9:02 AM, 9:02 AM-10:02 AM, etc.; 7:03 AM-8:03 AM, 8:03 AM-9:03 AM, 9:03 AM-10:03 AM, etc.; etc. during the monitoring period.

The upgrade manager 102 may analyze the data traffic and determine a load on the network 104. The upgrade manager 102 may analyze the data traffic and determine a load distribution across the network 104. For example, the upgrade manager 102 may analyze the data traffic and determine a load at each node of a network 104 and/or at each network device of the network 104. For example, the upgrade manager 102 may analyze the data traffic and determine the amount of data traffic, the amount of active sessions, and/or the amount of each type of active session at each of a plurality of APs and/or controllers of the network 104. For example, the upgrade manager 102 may determine a load at each node of a network 104 and/or at each network device of the network 104 by analyzing the data traffic stored over the monitoring period that was collected within each of the series of time windows including 7:00 AM-8:00 AM, 8:00 AM-9:00 AM, 9:00 AM-10:00 AM, etc.; 7:01 AM-8:01 AM, 8:01 AM-9:01 AM, 9:01 AM-10:01 AM, etc.; 7:02 AM-8:02 AM, 8:02 AM-9:02 AM, 9:02 AM-10:02 AM, etc.; 7:03 AM-8:03 AM, 8:03 AM-9:03 AM, 9:03 AM-10:03 AM, etc.; etc. of the monitoring period.

The upgrade manager 102 may identify a particular subset of the series of time windows. The subsets of the series of time windows may be sequential and non-overlapping. The particular subset of the series of time windows may be selected from the series of time windows based on a particular time window from the subset of the series of time windows including a relatively least amount of data traffic and/or a relatively least amount of a type of data traffic as compared to other particular time windows in other subsets of the series of time windows. That is, the series of time windows may be iteratively analyzed to identify which subset of the series of time windows includes a time window or time windows which include a relatively smallest amount of data traffic, a relatively fewest client sessions, and/or a relatively fewest amount of client sessions of a particular session type.

For example, the series of time windows may include data traffic stored over the monitoring period that was collected within a first subset including 7:00 AM-8:00 AM, 8:00 AM-9:00 AM, 9:00 AM-10:00 AM, etc.; within a second subset including 7:01 AM-8:01 AM, 8:01 AM-9:01 AM, 9:01 AM-10:01 AM, etc.; within a third subset including 7:02 AM-8:02 AM, 8:02 AM-9:02 AM, 9:02 AM-10:02 AM, etc.; within a fourth subset including 7:03 AM-8:03 AM, 8:03 AM-9:03 AM, 9:03 AM-10:03 AM, etc.; etc. The upgrade manager may identify a particular subset, such as the third subset including 7:02 AM-8:02 AM, 8:02 AM-9:02 AM, 9:02 AM-10:02 AM, etc. because a particular time window from 8:02 AM-9:02 AM may include a relatively smallest amount of data traffic, a relatively fewest client sessions, and/or a relatively fewest amount of client sessions of a particular session type as compared to the other time windows in the other series of windows.

The upgrade manager 102 may select a particular time window from the subset of the series of time windows. The upgrade manager 102 may select a particular time window from the subset of the series of time windows to identify a future time window within which to perform an upgrade of the network. For example, each of the time windows of the series of time windows corresponds to a window of time that data was collected from during a monitoring period. By extrapolation, each of the time windows of the series of time windows may correspond to a future window of time in a future period that corresponds to the monitoring period.

For example, a particular time window of Monday 8:01 AM-9:01 AM in the series of time windows may correspond to the one-hour period of time from 8:01 AM-9:01 AM on a Monday within a one hundred and sixty-eight hour one-week monitoring period. Continuing this example, the time windows in the series of time windows may be extrapolated of mapped to the corresponding day/hour/minute time windows of a future one hundred and sixty-eight hour one-week period. In this manner, the particular time window of Monday 8:01 AM-9:01 AM in the series of time windows may correspond not only to the one-hour period of time from 8:01 AM-9:01 AM on a Monday within a one hundred and sixty-eight hour one-week monitoring period, but also to the following one-hour period of time from 8:01 AM-9:01 AM on a Monday within a one hundred and sixty-eight hour one-week future period of time.

The upgrade manager 102 may select the particular time window from the subset of the series of time windows to perform an upgrade of the network 104 based on the analyzed data traffic. As described above, the data traffic being analyzed by the upgrade manager 102 may be historic. However, by selecting a particular time window from the subset of the series of time windows based on the analyzed historical data traffic collected from each of the time windows during the elapsed monitoring period, the update manager 102 may identify a future time window in a future period of time that corresponds to the selected particular time window. As such, the update manager 102 may identify a future time window, based on analysis of data traffic from a corresponding historical time window, to schedule and/or execute the application of the upgrade to the network 104.

As described above, the update manager 102 may select the particular time window based on the analyzed data traffic. For example, the update manager 102 may select a particular time window from the subset of the series of time windows based on the particular time window having a least amount of data traffic, active sessions, connected clients, and/or active sessions of a particular type (e.g., VOIP, video streaming, and/or other data intensive and/or interruption sensitive session types) as compared to the other time windows of the identified subset of the series time windows and/or the other time windows of the other subsets of the series of time windows.

In this manner, the update manger 102 may select a particular time window during which the load on the network 104, the load on particular nodes of the network 104, and/or the load on particular client devices on the network 104 was determined to be lightest or at a least amount as compared to other time windows. Such a time window, when extrapolated to a future period of time, may provide a time window during which an upgrade to the network will interrupt a correspondingly least amount of data traffic and/or produce a least amount of felt impact by clients, since the upgrade manager 102 may predict similar patterns of data traffic in the future based on the historical observations.

Further, selecting a time window with a relative least amount of data traffic or client sessions of a particular type, when extrapolated to a future period of time, may also provide a time window during which an upgrade to the network will interrupt a correspondingly least amount of particular types of data traffic and/or client sessions such as VOIP and video streaming, which may result in a least amount of visually noticeable degradation or discontinuation of VOIP calls and/or video streaming.

In some examples, the update manager 102 may select a particular time window during which a least amount of data traffic and/or client sessions are present on the network 104. In some examples, the upgrade manager 102 may determine that other particular time windows from the subset of the series of time windows or from other subsets of the series of time windows have a greater amount of data traffic and/or client sessions. However, the upgrade manager 102 may determine that the other particular time windows have fewer client sessions of a particular type than the selected particular time window. In examples where the upgrade manager 102 determines that the amount of the client sessions of the particular type at the selected particular time window are above a threshold level, the amount of the client sessions of the particular type at the other particular time window are below a threshold level, that a difference between the amount of data traffic or client sessions between the selected particular time window and the other particular time window is within a threshold amount of difference, and/or that the difference in the amount of the particular client sessions between the selected particular time window and the other particular time window exceeds a threshold amount, etc., the upgrade manager 102 may, instead, select the other particular time window despite that other particular time window not providing a least amount of data traffic or active sessions.

In some examples, the update manager 102 may assign different weights to the amount of data traffic and/or the amount of client sessions of a particular type in selecting a particular time window to perform an upgrade to the network 104. The update manager 102 may be adaptable to identify a particular time window for an upgrade based on a variety of data traffic conditions. The update manager 102 may be fine-tuned to select particular time windows that match a set of predetermined criteria for data traffic.

As described above, by analyzing data traffic over the series of time windows of the monitoring period, the update manger 102 may identify data traffic patterns. The update manager 102, may utilize these patterns to predict the future data traffic conditions in the network 104. As such, the update manager 102 may select a particular time window with particular data traffic characteristics, during which performing the network 104 upgrade would have a relatively minimal impact on client sessions and/or client sessions of a particular type. As such, the update manager 102 may remove the guess work of a network administrator predicting an upgrade time and replace it with a data-driven approach to identifying time windows with specific data characteristics that are suited for performing a network upgrade. The update manger 102 may schedule the upgrade to the network 104 based on the selected particular time window. The upgrade manger 102 may trigger the application of the upgrade to the network 104 at the schedule time.

Figure 2:
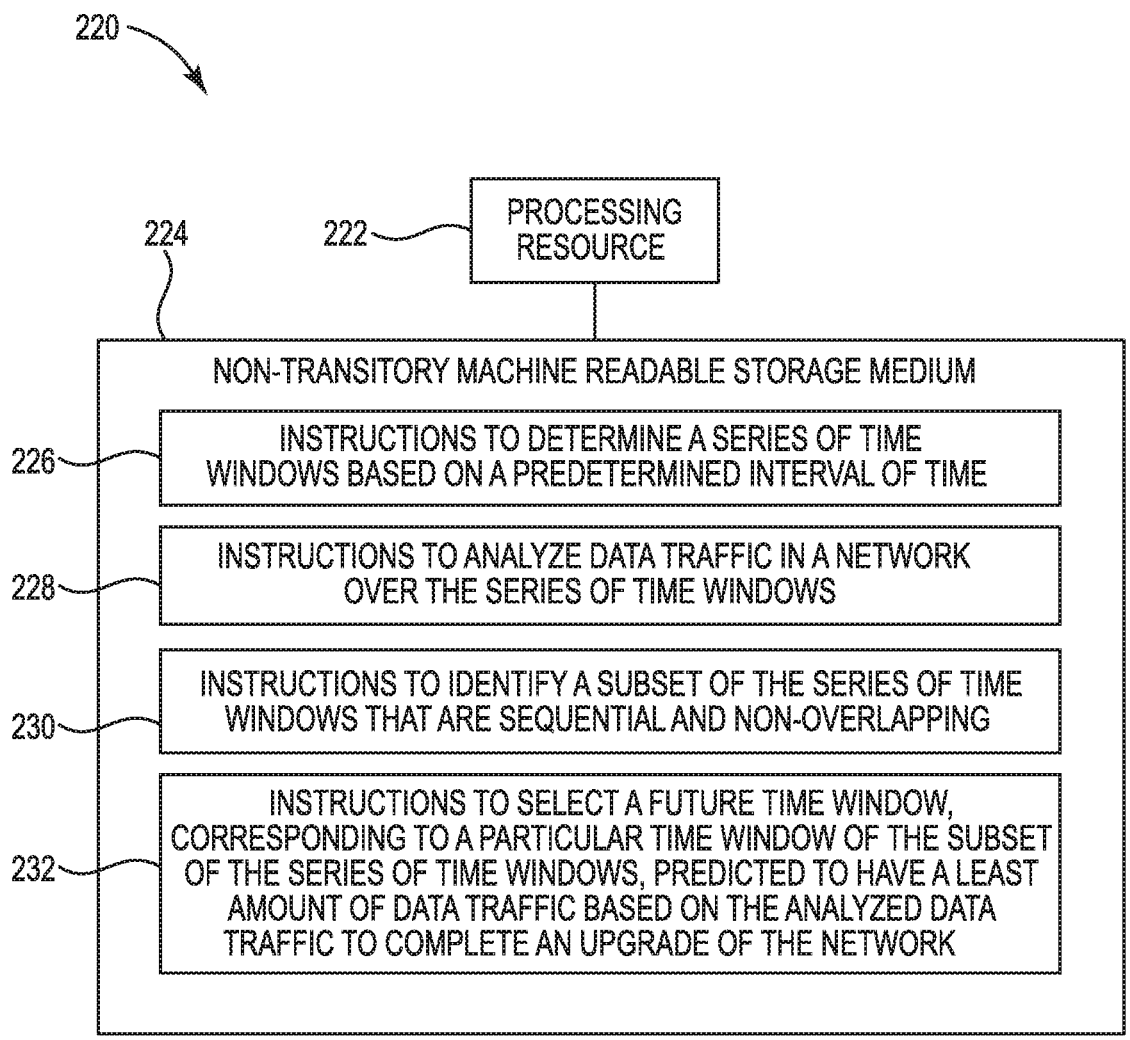
FIG. 2 illustrates a diagram of an example of a processing resource and a non-transitory machine-readable medium for network upgrades consistent with the disclosure.

FIG. 2 illustrates a diagram 220 of a processing resource 222 and a non-transitory machine-readable medium 224 for network upgrades, consistent with the disclosure. A memory resource, such as the non-transitory machine-readable medium 224, may be used to store instructions (e.g., 226, 228, 230, 232) executed by the processing resource 222 to perform the operations as described herein. The operations are not limited to a particular example described herein and may include additional operations such as those described with regard to the system 100 described in FIG. 1, the method 340 described in FIG. 3, and the computing device 570 described in FIG. 5.

A processing resource 222 may execute the instructions stored on the non-transitory machine readable medium 224. The non-transitory machine-readable medium 224 may be any type of volatile or non-volatile memory or storage, such as random-access memory (RAM), flash memory, read-only memory (ROM), storage volumes, a hard disk, or a combination thereof.

The machine-readable medium 224 may store instructions 226 executable by the processing resource 222 to determine a series of time windows based on a predetermined interval of time. The predetermined interval of time may be an amount of time that it will take to complete an upgrade to a computing network. As such, the series of time windows may be a series of time windows each having a same duration, where that duration is defined by the amount of time that an upgrade to the network will take.

The amount of time that an upgrade to the network will take may be an amount of time that the computing resources of the network will be repurposed for and/or additionally burdened with the retrieving, communicating, installing, and/or applying a new version or image of software, firmware, operating system, network settings, etc. for a portion of the network devices. The amount of time that an upgrade to the network will take may be defined by an amount of time, from when the upgrade process is initiated, until the network is back to full operational capacity with the new upgrade applied and/or operational.

The series of time windows may be overlapping and non-identical time segments over a monitoring period. Each subset of the series of time windows may have offset starting and/or ending times relative to one another, but the duration of each time window of each of the series of time windows may be identical and/or defined by the amount of time to upgrade the network (e.g., subset one starts and finishes on the hour of each monitoring period, subset two starts and finishes five minutes after the hour of the monitoring period, subset three starts and finishes ten minutes after each hour of the monitoring period, etc.). Within each subset, the time windows may be sequential and non-overlapping.

The machine-readable medium 224 may store instructions 228 executable by the processing resource 222 to analyze data traffic in a network over the series of time windows. Analyzing the data traffic may include developing a snapshot understanding of the amount and/or characteristics of the data traffic in the network during each series of time windows over a monitoring period. For example, the data traffic in the network during the series of time windows over the monitoring period may be analyzed to determine an amount of data traffic during each time window and/or an amount of a particular type of data traffic or client session identified within each of the series of time windows. Analyzing the data traffic may include analyzing the data traffic over portions of the network. For example, the data traffic at each node of the network or each network device of the network may be analyzed.

A pattern of the data traffic over the series of time windows may be identified by analyzing data traffic in the network during each of the time windows of the series of time windows. The pattern of data traffic may include the patterns and/or repeating cycles of the amount and/or characteristics of the data traffic that occur in the series of time windows over the monitoring period. Identifying a pattern of the data traffic may, for example, include identifying cyclic amounts and/or characteristics of the data traffic that occur over cyclic time windows, such as from 2:00 AM-3:00 AM every day in a one-week monitoring period or every Monday from 2:00 AM-3:00 AM in a one-month monitoring period.

The machine-readable medium 224 may store instructions 230 executable by the processing resource 222 to identify a subset of the series of time windows. Identifying the subset of the series of time windows may include identifying a subset of the series of time windows that are sequential and non-overlapping. As described above, the series of time windows may include a plurality of subsets of time windows that successively extend across a portion of the duration of the monitoring period. The particular subset of the series of time windows that is identified may be the subset that includes a particular time window or time windows within which a targeted data traffic amount and/or targeted data traffic characteristics have been identified by the analysis of the data traffic. For example, the particular subset of the series of time windows that is identified may be the subset that includes a particular time window or time windows within which an amount of data traffic below a threshold amount and/or an amount of data traffic with particular characteristics, such as client session type, below a threshold amount has been identified. In some examples, the particular subset of the series of time windows that is identified may be the subset that includes a particular time window or time windows within which a least amount of data traffic relative to other time windows in other subsets of the series of time windows and/or a least amount of data traffic with particular characteristics relative to other time windows in other subsets of the series of time windows has been identified.

An amount of data traffic and/or an amount of data traffic with particular characteristics may be predicted for each of a plurality of future time windows. That is, the analyzed historical data traffic and/or the identified historical data traffic patterns derived therefrom may be utilized to predict an amount of data traffic and/or an amount of data traffic with particular characteristics that will be present during each of a plurality of future time windows. For example, each time window of the series of time windows may have a corresponding future time window. In an example, a Monday 2:00 AM-3:00 AM historical time window in a one-week first week of a month monitoring period may have a corresponding Monday 2:00 AM-3:00 AM future time window in the second week of the month which has not yet occurred. Therefore, by identifying an amount of data traffic and/or an amount of data traffic with particular characteristics is a historical time window, assumptions may be made about what the conditions will be in future corresponding time windows.

The machine-readable medium 224 may store instructions 232 executable by the processing resource 222 to select a future time window, corresponding to a particular time window of the identified subset of the series of time windows, during which to perform the network upgrade. The future time window that is selected for performing the network upgrade may be selected based on the future time window having a least amount of data traffic predicted from analysis of the historical data traffic and/or a least amount of data traffic of a particular type predicted from analysis of the historical data traffic relative to other particular time windows of the series of time windows. That is, by comparing the historical data traffic collected from the historical time windows to one another, an amount of data traffic and/or an amount of data traffic with particular characteristics for corresponding future time windows may be predicted.

The upgrade to the network may be scheduled for the selected future time window. In some examples, scheduling the upgrade may include reporting a suggestion of the future time window and/or alternative future time windows to complete the upgrade to a network administrator. In some examples, scheduling the upgrade may include executing the upgrade to the network during the future time window without intervention from a network administrator. In such examples, a new image of instructions to be applied to network devices may be retrieved, communicated, installed, and/or applied to the network devices targeted by the network upgrade.

Figure 3:
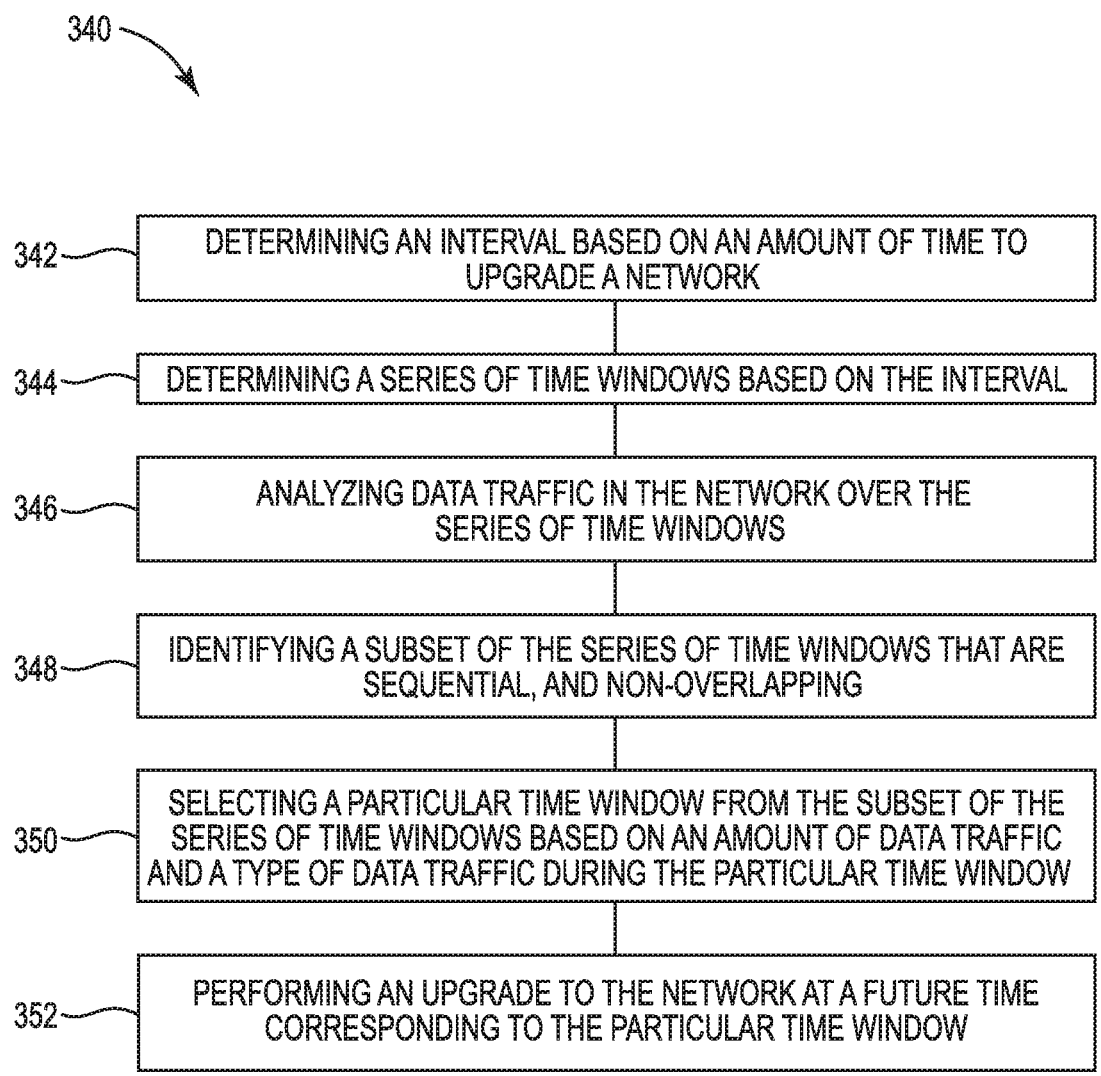
FIG. 3 illustrates a diagram of an example of a method for network upgrades consistent with the disclosure.

FIG. 3 illustrates a diagram of a method 340 for network upgrades consistent with the disclosure. The method 340 is not limited to any particular set and/or order of operations. The method 340 may include additional operations such as those described with regard to the system 100 described in FIG. 1, the machine-readable medium 224 described in FIG. 2, and the computing device 570 described in FIG. 5.

At 342, the method 340 may include determining an interval for a series of time windows. The interval may be based on an amount of time to upgrade a network. As the method 340 may be utilized to schedule the completion of the upgrade to the network, determining the interval may include defining the duration of time windows over which data traffic in the network may be analyzed in order to identify a time slot for the completion of the upgrade. The duration of the interval may be specific to a particular upgrade that will be performed. The duration of the interval may be specific to a particular type of upgrade to the network that will be performed. The duration of the interval may be a generic to network upgrades in general.

At 344, the method 340 may include determining a series of time windows based on the interval. The duration of the series of time windows may be, as described above, defined by the amount of time to perform an upgrade. However, the arrangement of the series of time windows within a period of time for monitoring the network may be determined such that the series of time windows are made up of constituent subsets of sequential and non-overlapping time windows that span the monitoring period. Collectively, however, the series of time windows may be overlapping and non-identical time windows spanning the monitoring period. The offset between the time windows within a subset and the time windows across subsets of the series of time windows may include any amount of time. However, the series of time windows may be determined such that they capture a variety of time segments of a monitoring period having a duration determined by the duration to complete the network upgrade. For example, the series of time windows may be determined such that a same hour during the monitoring period is segmented and/or analyzed in a wide variety of ways, having the varied segments included in different time windows of a same duration.

At 346, the method 340 may include analyzing data traffic in the network over the series of time windows. Analyzing the data traffic may include monitoring, over a monitoring period, the data traffic at each of a plurality of network controllers making up a cluster of controllers in the network. The monitoring period may be a configurable time period. The monitoring period may be configurable by a network administrator. The monitoring period may be configured without intervention from a network administrator. In some examples, the monitoring period may be configured based on memory or processing resource for determining and/or storing analysis of the data traffic. In some examples, the monitoring period may be configured to a time period standardized to a type of the network, network devices, and/or a type of network upgrade to be completed.

Analyzing the data traffic may include recording the data traffic, the amount of data traffic, and/or characteristics of the data traffic in the network during the monitoring period into storage media. In some examples, portions of the recordings may be overwritten in order to have available the freshest, most recent, and/or most relevant data traffic analysis available. For example, overwriting a portion of data traffic recorded at the beginning of the monitoring period with data traffic recorded immediately following the lapsing of the monitoring period may be performed to keep a record of the most recent data traffic within the network filling a duration equal to the monitoring period.

Analyzing the data traffic may include determining and/or recording an amount of data traffic and/or an amount of data traffic with particular characteristics within the time windows of the series of time windows. For example, analyzing the data traffic may include determining, from historical data about the data traffic collected during the series of time windows, the amount of active client sessions on the network. Analyzing the data traffic may also include determining, from historical data about the data traffic collected during the series of time windows, the amount of active client sessions of a particular type on the network, such as an amount of clients in an active voice or video streaming session on the network over the series of time windows based on the analyzed data traffic.

At 348, the method 340 may include identifying a subset of the series of time windows that are sequential and non-overlapping. Identifying the subset of the series of time windows may include identifying the subset from a plurality of subsets making up the series of time windows, the identified subset of the series including a time window or time windows during which a relative amount of data traffic and/or a relative amount of data traffic with particular characteristics was transmitted on a portion of the network. For example, the identified subset of the series of time windows may include time windows which, relative to other time windows and/or other subsets, has a relatively smallest amount of data traffic and/or a relatively smaller amount of a type of data traffic. That is, identifying the subset of the series of time windows may include identifying the subset that segments the monitoring period into the intervals in a manner that produces time windows having a relatively smallest amount of data traffic and/or a relatively smallest amount of a type of data traffic relative to other segmentations of the monitoring period.

At 350, the method 340 may include selecting a particular time window from the subset of the identified subset of the series of time windows. The particular time window may be selected based on an amount of data traffic and/or a type of data traffic during the particular time window. For example, determining the particular time window from the subset of time windows may include identifying the particular time window from the subset of time windows that has a smaller amount of the type of data traffic than other time windows of the subset of time windows. For example, determining the particular time window from the subset of time windows may include identifying the particular time window from the subset of time windows that has a smaller amount of clients in an active voice or video streaming session on the network than other time windows of the subset of time windows.

At 352, the method 340 may include performing an upgrade to the network at a future time corresponding to the particular time window. As described above, each time window of the series of time windows may be utilized to predict data traffic at a corresponding future time window. As such, a future time window that corresponds to the selected time window may be predicted to have same or similar data traffic conditions. Therefore, by identifying a particular time window from the identified subset of time windows having data traffic favorable to performing a network upgrade (e.g., a relatively smaller amount of data traffic and/or a relatively smaller amount of data traffic of a particular type), a future time window with similarly favorable conditions may be identified and selected for performing an upgrade to the network. Performing the upgrade to the network may include retrieving, communicating, installing, and/or applying a new version or image of software, firmware, operating system, network settings, etc. for a portion of the network devices within the future time window.

Figure 4:
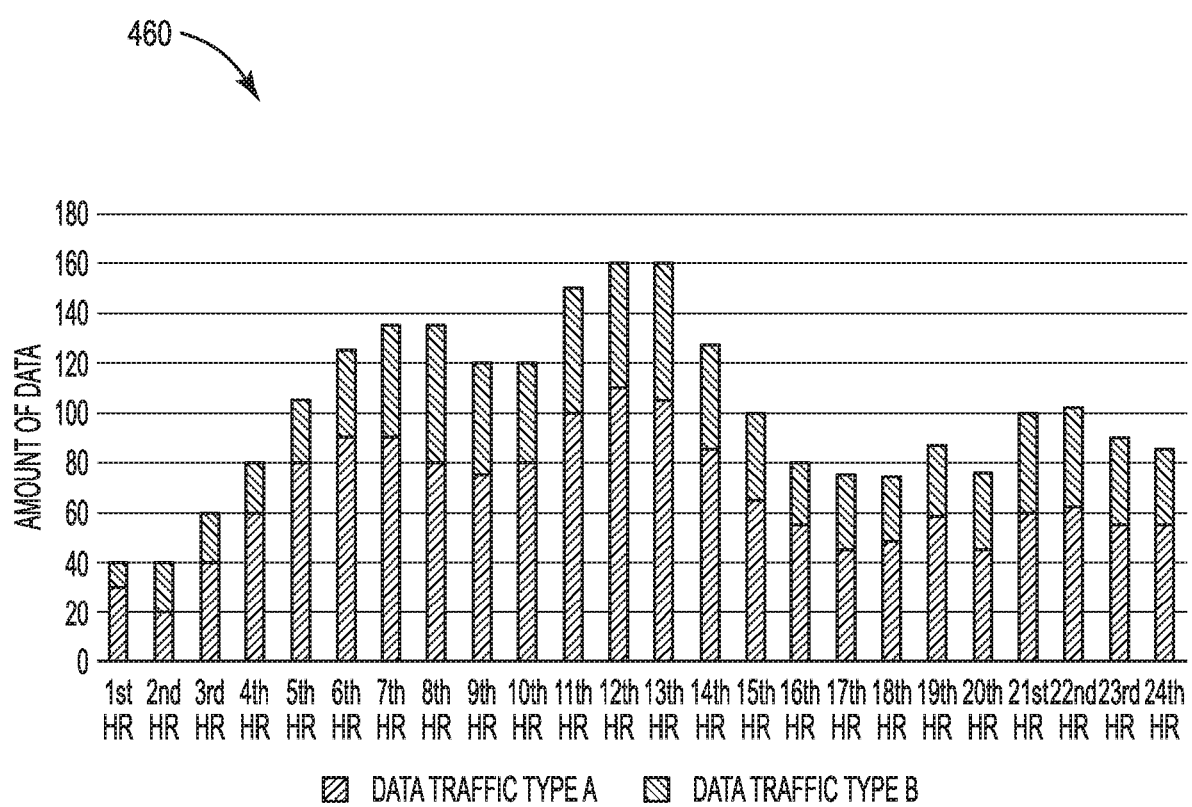
FIG. 4 illustrates a graph of an example of data traffic for network upgrades consistent with the disclosure.

FIG. 4 illustrates an example of a graph 460 that may be produced from the analysis of data traffic in the network over the series of time windows consistent with the disclosure. The graph 460 may be utilized in the system 100 illustrated in FIG. 1, the machine-readable medium 224 described in FIG. 2, the method 340 illustrated in FIG. 3, and the computing device 570 described in FIG. 5.

The graph 460 may illustrate the data traffic recorded in a twenty-four-hour monitoring period for a particular identified subset of the series of time windows. In such an example, each of the time windows may have a one-hour duration determined from the amount of time to complete a network upgrade. In such an example, the time window of the first hour ($1^{st}$ HR) may be a period of time running from 12:01 AM until 1:01 AM, the time window of the second hour ($2^{nd}$ HR) may be a period of time running from 1:01 AM until 2:01 AM, etc.

A particular time window of the subset of the series of time windows appearing in the graph 460 may be selected. The particular window may be selected based on the overall amount of data traffic and/or the amount of data traffic of a particular type within each window. For example, the particular window with the relatively smallest amount of data traffic overall may be selected from the subset. In graph 460, the time window for the first hour of the monitoring period and the time window for the second hour of the monitoring period may have an identical overall amount of data. The overall amount of data of each one of the first hour and the second hour of the monitoring period may be a smaller amount of overall data than the overall amount of data from any one of the third through the twenty-fourth hour of the monitoring period. As such, both the first hour and the second hour of the monitoring period may represent equally good candidate for selection of the particular time window from the perspective of overall data traffic.

However, the first hour and the second hour of the monitoring period include different amounts of particular types of data traffic making up the overall amount of data traffic. In graph 460, data traffic "TYPE A" may include non-VOIP and/or non-video streaming data traffic on the network. In graph 460, data traffic "TYPE B" may include VOIP and/or video streaming data traffic on the network. In such an example, the particular time window, between the first hour and the second hour of the monitoring period, with a smaller amount of a particular type of data traffic such as "TYPE B" may be selected as the particular window in instances where the overall amount of data is similar or identical. As such, the first hour of the monitoring period may be selected from the subset of the series of time windows.

A future time window corresponding to the selected particular time window of the subset of the series of time windows may be selected for performing the network upgrade. For example, where the time window of the first hour may be a period of time running from 12:01 AM until 1:01 AM, a future time window running between 12:01 AM until 1:01 AM on a future date may be selected for retrieving, communicating, installing, and/or applying a network upgrade on the network.

Figure 5:
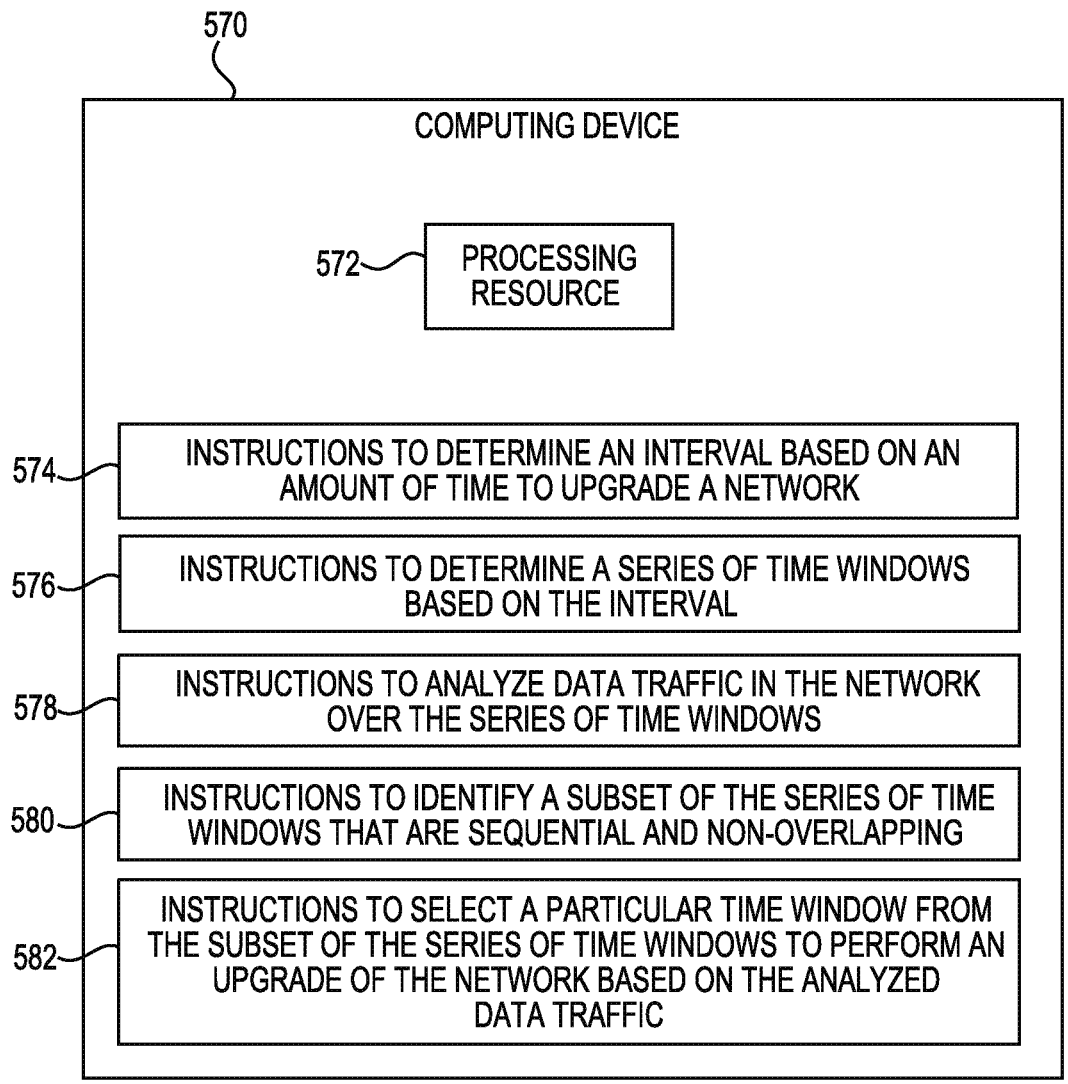
FIG. 5 illustrates a diagram of an example of a computing device for network upgrades consistent with the disclosure.

FIG. 5 illustrates an example of a computing device 570 for network upgrades consistent with the disclosure. The computing device 570 and/or the functions resulting from the execution of instructions (e.g., 574, 576, 578, 580, and 582) may be utilized in and/or include the system 100 illustrated in FIG. 1, the machine-readable medium 224 described in FIG. 2, the method 340 illustrated in FIG. 3, and the computing device 570 described in FIG. 5.

The computing device 570 may include a network device and/or a plurality of network devices. The computing device 570 may, for example, be a network controller comprising instructions, such as instructions 574, 576, 578, 580, and 582, executable by the processing resource 572 to perform various functions associated with network upgrades.

The processing resource 572 may be a component of the computing device 570, may be associated with or assigned to the computing device 570, may be a shared or common processing resource 572 and/or may be a component of a distinct computing device. The processing resource 572 may execute instructions, such as instructions 574, 576, 578, 580, and 582, stored at or accessible to the computing device 570. In executing the instructions, the processing resource 572 may cause the computing device 570 to perform specific operations and/or functions.

The processing resource 572 may execute the instructions stored on a non-transitory machine readable medium. The non-transitory machine-readable medium may be any type of volatile or non-volatile memory or storage, such as random-access memory (RAM), flash memory, read-only memory (ROM), storage volumes, a hard disk, or a combination thereof.

In some examples, the computing device 570 may include instructions 574 executable by the processing resource 572 to determine an interval. The interval may be determined based on an amount of time that will elapse in order to complete an upgrade to a network.

The computing device 570 may include instructions 576 executable by the processing resource 572 to determine a series of time windows. The series of time windows may be determined based on the previously determined interval.

The computing device 570 may include instructions 578 executable by the processing resource 572 to analyze data traffic in the network. For example, the data traffic in the network occurring over the series of time windows may be analyzed.

The computing device 570 may include instructions 580 executable by the processing resource 572 to identify a subset of the series of time windows. The subset of the series of time windows may be a subset of windows that are sequential. Additionally, the subset of the series of time windows may be a subset of windows that are non-overlapping.

The computing device 570 may include instructions 582 executable by the processing resource 572 to select a particular time window to perform an upgrade of the network. The particular time window may be selected from the subset of the series of time windows. The particular time window may be selected based on the analyzed data traffic.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a plurality of additional examples of the present disclosure. In addition, the proportion and the relative scale of the elements provided in the figures are intended to illustrate the examples of the present disclosure and should not be taken in a limiting sense.

What is claimed:

1. A system comprising:
 a processing resource;
 a computing device comprising instructions executable by the processing resource to:
  determine an interval based on an amount of time to upgrade a network;
  determine a series of time windows based on the interval;
  analyze data traffic in the network over the series of time windows;
  identify a subset of the series of time windows that are sequential and non-overlapping;
  monitor the data traffic at each of a plurality of controllers making up a cluster of controllers;
  record the monitored data traffic for a configurable monitoring period;
  overwrite a portion of data traffic recorded at the beginning of the monitoring period with data traffic recorded immediately following the lapsing of the monitoring period;
  select a particular time window from the subset of the series of time windows to perform an upgrade of the network based on the analyzed data traffic.

2. The system of claim 1, wherein the series of time windows include a plurality of overlapping and non-identical time windows.

3. The system of claim 1, wherein the instructions to analyze the data traffic in the network include instructions to determine a number of clients utilizing the network during each of the series of time windows.

4. The system of claim 1, wherein the instructions to analyze the data traffic in the network include instructions to determine a type of client session utilizing the network during each of the series of time windows.

5. The system of claim 1, wherein the instructions to analyze the data traffic in the network include instructions to determine a load on each of a plurality of controllers of the network.

6. The system of claim 1, wherein the instructions to analyze the data traffic in the network include instructions to determine a number of active sessions on each of a plurality of controllers of the network.

7. The system of claim 1, wherein the instructions to select the particular time window include instructions to select the particular time window from the subset of the series of time windows with a least number of clients utilizing the network.

8. The system of claim 1, wherein the instructions to select the particular time window include instructions to select the particular time window from the subset of the series of time windows with a least amount of sessions of a particular type on the network.

9. A non-transitory machine-readable medium storing instructions executable by a processing resource to:
   determine a series of time windows based on a predetermined interval of time;
   analyze data traffic in a network over the series of time windows;
   identify a subset of the series of time windows that are sequential and non-overlapping;
   identify a pattern of the data traffic over the series of time windows;
   predict a number of clients and a type of traffic on the network for each of a plurality of future time windows corresponding to the subset of the series of time windows based on the pattern of data traffic over the series of time windows;
   select a future time window, corresponding to a particular time window of the subset of the series of time windows, predicted to have a least amount of data traffic based on the analyzed data traffic to complete an upgrade of the network.

10. The non-transitory machine-readable medium of claim 9, including instructions executable to predict the future time window with the least amount of data traffic based on a comparison of the number of clients and the type of traffic on the network for each of the plurality of future time windows corresponding to the subset of the series of time windows.

11. The non-transitory machine-readable medium of claim 9, wherein predetermined interval is an amount of time to complete the upgrade of the network.

12. The non-transitory machine-readable medium of claim 11, including instructions executable to schedule the upgrade of the network for the selected future time window.

13. A method comprising:
   determining an interval based on an amount of time to upgrade a network;
   determining a series of time windows based on the interval;
   analyzing data traffic in the network over the series of time windows;
   identifying a subset of the series of time windows that are sequential and non-overlapping;
   monitoring the data traffic at each of a plurality of controllers making up a cluster of controllers;
   recording the monitored data traffic for a configurable monitoring period;
   overwriting a portion of data traffic recorded at the beginning of the monitoring period with data traffic recorded immediately following the lapsing of the monitoring period;
   selecting a particular time window from the subset of the series of time windows based on an amount of data traffic and a type of data traffic during the particular time window; and
   performing an upgrade to the network at a future time corresponding to the particular time window.

14. The method of claim 13, including determining a number of clients in an active voice or video streaming session on the network over the series of time windows based on the analyzed data traffic.

15. The method of claim 13, determining the particular time window from the subset of time windows has a relatively smaller amount of the type of data traffic than other time windows of the subset of time windows.

* * * * *